UNITED STATES PATENT OFFICE.

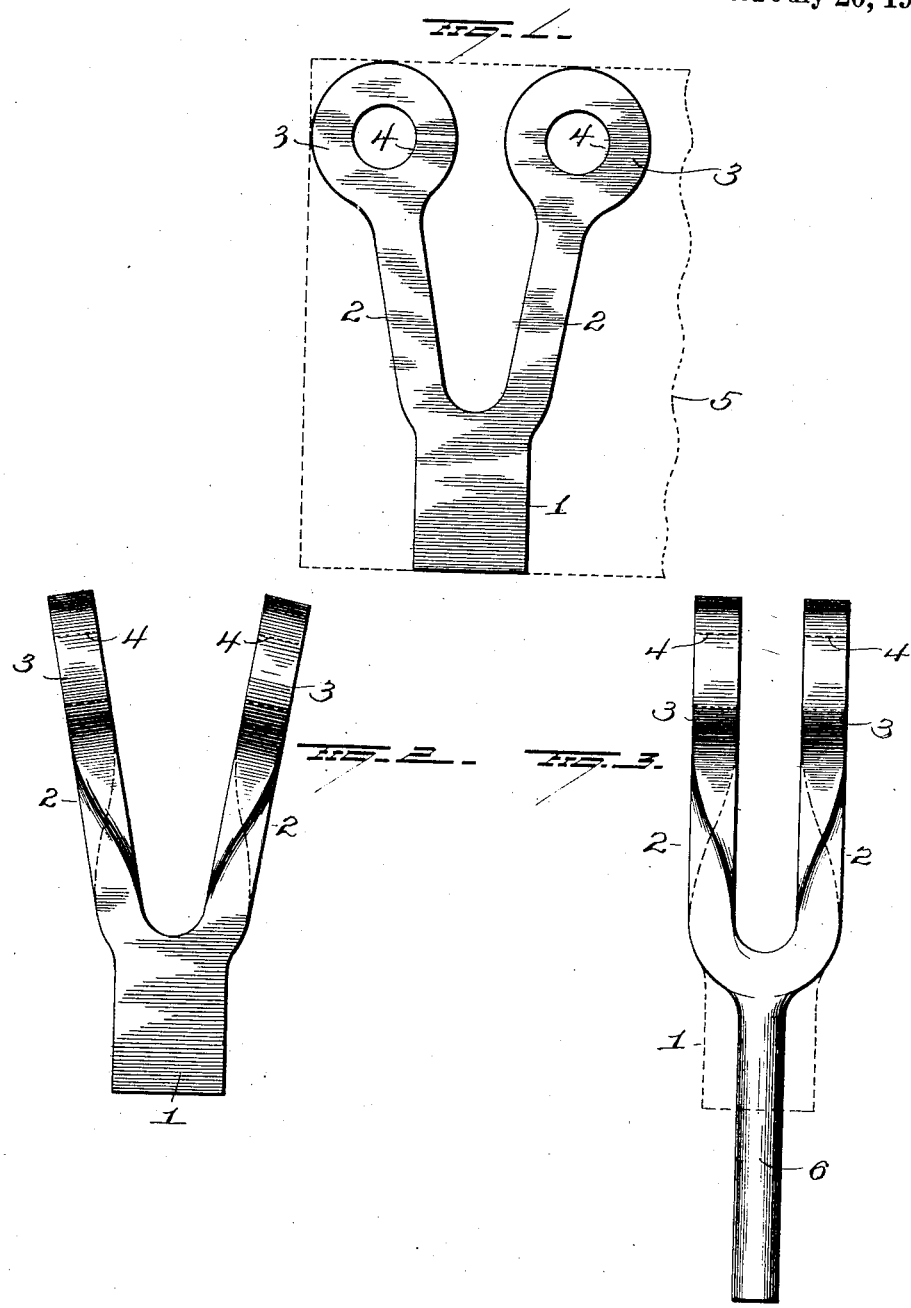

ROBERT R. WEAVER, OF COLUMBUS, OHIO.

MANUFACTURE OF JAWS FOR BRAKE-ROD CONNECTIONS.

1,347,137.  Specification of Letters Patent.  Patented July 20, 1920.

Application filed August 9, 1918. Serial No. 249,171.

*To all whom it may concern:*

Be it known that I, ROBERT R. WEAVER, a citizen of the United States, and a resident of Columbus, in the county of Franklin and State of Ohio, have invented certain new and useful Improvements in the Manufacture of Jaws for Brake-Rod Connections; and I do hereby declare the following to be a full, clear, and exact description of the invention, such as will enable others skilled in the art to which it appertains to make and use the same.

This invention relates to improvements in the manufacture of jaws such as are employed in the rod-and-lever connections of brake mechanism for railway cars,—one object of the invention being to provide an improved method of making such jaws, whereby the disadvantages incident to drop forging and the making of the jaws in parts welded together, shall be avoided; and so that a jaw shall be produced in which the juncture of the parallel arms or members with the shank portion will be effectually braced.

A further object is to provide a simple and efficient method of making a jaw of the type specified, in a single integral structure.

With these and other objects in view, the invention consists in certain novel steps in the method of making a jaw of the character set forth, as hereinafter described and pointed out in the claim.

In the accompanying drawings, Figure 1 is a view illustrating the first step of the method. Fig. 2 is a view showing the appearance of the structure after the second step, and Fig. 3 is a view of the finished jaw.

In proceeding to make the jaw, I first cut, by means of a suitable die, from a plate or sheet of metal a blank having the form indicated in Fig. 1. This blank is formed with a shank portion 1 and two arms or members 2—2 radiating from the shank and having rounded heads 3 at their free ends,— said heads being provided with holes 4 which may be formed at the same time that the blank is cut from the sheet of metal 5.

The blank having been cut or stamped from a sheet of flat metal, the various parts of said blank will be angular (preferably square) in cross-section.

The two radiating arms or members 2 will next be given a quarter twist as indicated in Fig. 2, and then the two arms or members 2 will be bent toward each other until they are parallel as shown in Fig. 3. The shank portion 1 will be drawn out by a hammer or other method until it assumes the form shown at 6 in Fig. 3, and during this drawing out step the portion 6 which constitutes the shank of the finished jaw, will be rounded. It is the intention to rigidly secure the free end of the shank 6 to a brake-rod, preferably by welding.

By making the jaw in the manner above described, the disadvantages incident to welding the parts thereof together will be obviated; there will be no necessity for trimming as when the jaws are made by forging, and by reason of the rounded form of the yoke portion 7 which connects the members 2, the juncture of said members with said yoke and the shank will be braced as the metal at this point is retained as contradistinguished from the V-shaped formation incident to the structure of jaws as heretofore made.

Having fully described my invention what I claim as new and desire to secure by Letters-Patent, is:

The method of making a jaw of the character described, consisting in cutting from a plate of metal, a blank having two arms radiating from a shank member and having perforated heads at their free ends; twisting said radiating arms one-fourth of a turn, and afterward bending the twisted arms toward each other until their heads become parallel.

In testimony whereof I have signed this specification in the presence of two subscribing witnesses.

ROBERT R. WEAVER.

Witnesses:
F. M. COWGILL,
H. A. WILFORD.